(12) United States Patent
Chung et al.

(10) Patent No.: US 9,594,205 B2
(45) Date of Patent: Mar. 14, 2017

(54) BACKLIGHT MODULE, DISPLAY COMPRISING THE SAME AND METHOD FOR MANUFACTURING LIGHT GUIDING PLATE

(71) Applicant: InnoLux Corporation, Miao-Li County (TW)

(72) Inventors: Chao-Fang Chung, Miao-Li County (TW); Chi-Liang Chang, Miao-Li County (TW); Chen-Chia Wu, Miao-Li County (TW)

(73) Assignee: INNOLUX CORPORATION (TW)

( * ) Notice: Subject to any disclaimer, the term of this patent is extended or adjusted under 35 U.S.C. 154(b) by 95 days.

(21) Appl. No.: 14/607,125

(22) Filed: Jan. 28, 2015

(65) Prior Publication Data
US 2015/0212253 A1    Jul. 30, 2015

(30) Foreign Application Priority Data

Jan. 29, 2014    (TW) ............................. 103103560 A (51) Int. Cl.
*F21V 8/00*    (2006.01)
*B29D 11/00*    (2006.01)

(52) U.S. Cl.
CPC ...... *G02B 6/0045* (2013.01); *B29D 11/00721* (2013.01); *G02B 6/0036* (2013.01); *G02B 6/0038* (2013.01); *G02B 6/0065* (2013.01); *G02B 6/0093* (2013.01)

(58) Field of Classification Search
CPC .. G02B 6/0036; G02B 6/0038; G02B 6/0045; G02B 6/0065; G02B 6/0093; B29D 11/00721
See application file for complete search history.

(56) References Cited

U.S. PATENT DOCUMENTS

| | | | |
|---|---|---|---|
| 5,779,337 A * | 7/1998 | Saito ................... | G02B 6/0038 362/23.15 |
| 7,397,605 B2 * | 7/2008 | Mai ...................... | G02B 5/0221 359/599 |
| 7,695,180 B2 * | 4/2010 | Schardt ............... | G02B 5/0242 362/23.18 |

(Continued)

FOREIGN PATENT DOCUMENTS

| | | |
|---|---|---|
| JP | 2012164511 A | 8/2012 |
| TW | 200946975 A | 11/2009 |
| TW | 201142387 A | 12/2011 |

*Primary Examiner* — Alan Cariaso
(74) *Attorney, Agent, or Firm* — Bacon & Thomas, PLLC (57) ABSTRACT

The present invention relates to a backlight module, a display comprising thereof and a method for manufacturing a light guiding plate. The backlight module comprising: a housing; a light guiding plate disposed in the housing, and the light guiding plate comprises a light entrance surface, a bottom surface, and a light exit surface; and a light source disposed adjacent the light entrance surface of the light guiding plate, wherein a horizontal cross section of the light exit surface of the light guiding plate has a first curve, and a vertical cross section of the light exit surface of the light guiding plate through any peak of the first curve has a second curve, wherein adjacent peaks of the first curve have a same distance therebetween, and adjacent troughs of the first curve are spaced apart by first distances.

9 Claims, 6 Drawing Sheets

(56) References Cited

U.S. PATENT DOCUMENTS

| | | | | |
|---|---|---|---|---|
| 8,113,705 | B2* | 2/2012 | Kim | G02B 6/0038 349/64 |
| 8,436,960 | B2* | 5/2013 | Teragawa | G02B 5/045 349/62 |
| 8,503,082 | B2* | 8/2013 | Ehnes | G02B 5/0221 359/620 |
| 8,899,814 | B2* | 12/2014 | Kojima | G02B 5/045 362/615 |
| 2013/0201660 | A1* | 8/2013 | Barbier | B32B 33/00 362/97.1 |
| 2013/0277870 | A1 | 10/2013 | Greener et al. | |

* cited by examiner

BACKLIGHT MODULE, DISPLAY COMPRISING THE SAME AND METHOD FOR MANUFACTURING LIGHT GUIDING PLATE

CROSS REFERENCE TO RELATED APPLICATION

This application claims the benefits of the Taiwan Patent Application Serial Number 103103560, filed on Jan. 29, 2014, the subject matter of which is incorporated herein by reference.

BACKGROUND OF THE INVENTION

1. Field of the Invention

The present invention relates to a backlight module, a display comprising the same and a method for manufacturing a light guiding plate, and particularly to a backlight module having a special pattern, to reduce the dose of light source, solve the problem of collimated light in the conventional backlight module, and reduce the manufacturing cost of the backlight module.

2. Description of Related Art

With the development trend of miniaturization and light-weight of electronic device, the volume of backlight module in a display is adapted to this trend. A backlight module is an indispensable element of a display device, usually composed of a backboard, a light guide plate, a light source and multiple optical films.

In the current backlight module, after the light source incidences to the light guide plate, the total reflection is destroyed by dot array, to scatter the light source out of the light guide plate. To evenly scatter the light out of the light guide plate, besides the dot array design, the light source spacing and the distance between the dots should also be considered. If the light source spacing is small, multiple light sources are required, thereby increasing the cost; however, if the light source spacing is large, the hotspot problem will be an issue due to the reduced number of the light source, thereby detrimentally affecting the luminous quality.

Conventionally, in order to solve the hotspot problem of the light guide plate, in most light guide plates, the light entrance side close to the light source is cut out an R-cut or a V-cut. However, it is less economical for an extrusion light guide plate to be cut out an R-cut or a V-cut on a cutting board. A lenticular layer is typically added on the light guide plate to solve this problem. On the other hand, although an injection light guide plate may be made with the R-cut or V-cut, it is not easy to make a thin injection light guide plate, and it remains an obstacle to miniaturization.

However, although the combination of the light guide plate and the lenticular layer can improve light divergence uniformity of the backlight module and reduce the manufacturing costs, it will cause the backlight module to have collimated light phenomenon, thereby degrading aesthetic.

In view of the above, if a backlight module can be provided, which can solve hotspot and collimated light problems and reduces the manufacturing costs at the same time, it would represent a new milestone in the development of the backlight module technology.

SUMMARY OF THE INVENTION

An object of the present invention is to provide a backlight module and a method for manufacturing a light guide plate in the backlight module, so as to form a special structure pattern on the light guide plate, to destroy the proceeding of the collimated light, thereby fulfilling the requirements of the light divergence uniformity and aesthetic appearance.

Another object of the present invention is to provide a display that includes the backlight module of the present invention, in order to provide the display with better display quality.

To achieve the above object, the present invention provides a backlight module, comprising: a housing; a light guiding plate disposed in the housing, and light guiding plate comprises a light entrance surface, a bottom surface, and a light exit surface, wherein the bottom surface and the light exit surface are spaced apart and disposed opposite to each other, and two opposite sides of the light entrance surface are connected to the bottom surface and the light exit surface respectively, wherein a direction parallel to the light entrance surface is defined as a horizontal direction, and a direction vertical to the light entrance surface is defined as a vertical direction; and a light source disposed adjacent the light entrance surface of the light guiding plate, wherein a horizontal cross section of the light exit surface of the light guiding plate has a first curve, and a vertical cross section of the light exit surface of the light guiding plate through any peak of the first curve has a second curve, wherein adjacent peaks of the first curve have a same distance therebetween, and adjacent troughs of the first curve are spaced apart by first distances, wherein any two adjacent first distances are different from each other, and adjacent peaks of the second curve are spaced apart by second distances, and any two adjacent second distances are different from each other.

Basically, the application field of the backlight module according to the present invention is not particularly limited, and for example, it can be used in a monitor, a notebook computer, a digital camera, a projector and so on.

Furthermore, the present invention also provides a method for manufacturing a light guide plate in the backlight module, comprising the following steps:

(a) providing a substrate and a round knife having a fixed radius of curvature, wherein the substrate has a first direction and a second direction perpendicular to the first direction;

(b) translating the round knife along the second direction of the substrate, while moving the round knife vertically with respect to the substrate, so that a moving path of a vertex of the round knife forms a mirroring second curve;

(c) translating the round knife along the first direction of the substrate to a distance, and performing the step (b) to form a plurality of mirroring second curves;

(d) repeating the step (c), so that a cross-sectional of the substrate in the first direction forms a mirroring first curve to produce a template; and (e) performing an imprinting process using the template to obtain a light guide plate.

In addition, the present invention still provides a display device comprising: the backlight module of the present invention; and a display panel disposed at a side of the light exit surface of the light guide plate.

DETAILED DESCRIPTION OF THE PREFERRED EMBODIMENT

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention, and those skilled in the art will appreciate that various modifications, additions and substitutions are possible.

Figure 1:
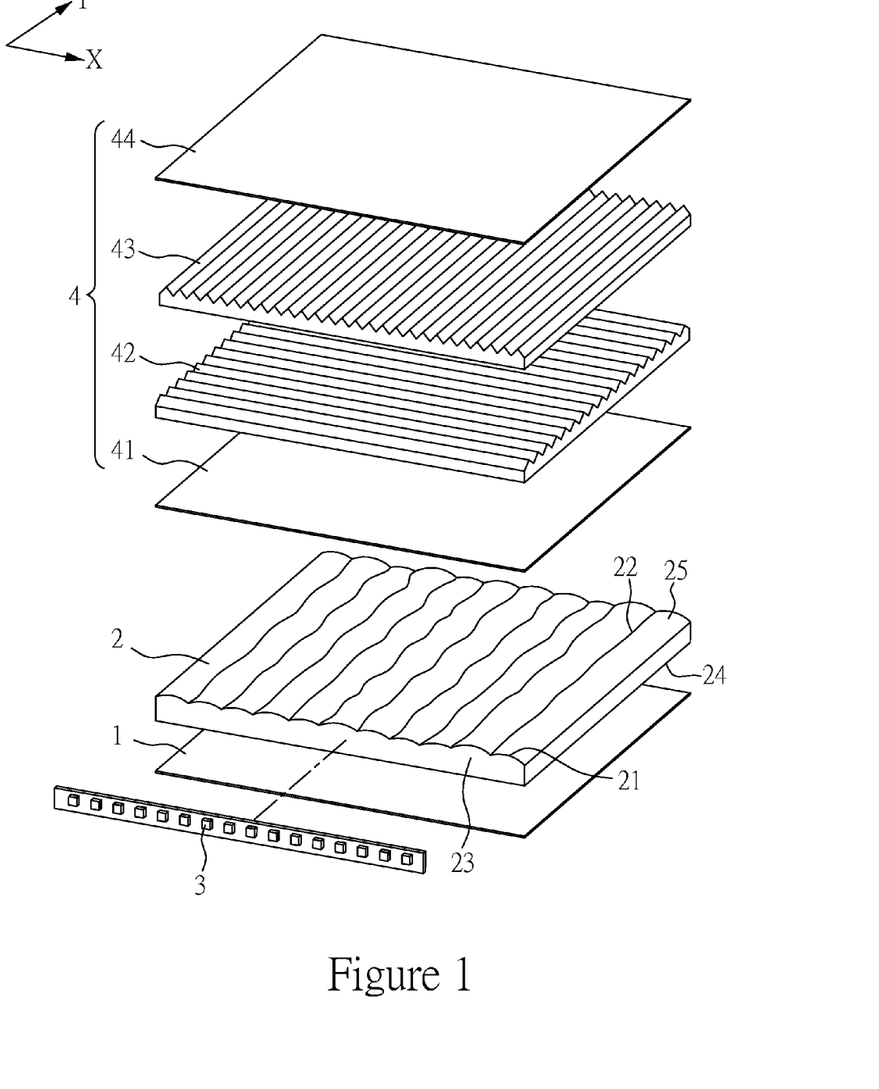
FIG. 1 shows a schematic diagram of the backlight module according to embodiments of the present invention.

FIG. 1 shows a schematic diagram of the backlight module according to embodiments of the present invention. The steps for manufacturing the backlight are described as follows. First, a housing 1, a light guide plate 2 and a light source 3 are provided, and a plurality of light emitting diodes (LED) are used as the light source in this embodiment. The light guide plate 2 is formed in the housing 1 and includes a light entrance surface 23, a bottom surface 24 and a light exit surface 25, wherein the bottom surface 24 and the light exit surface 25 are spaced apart and disposed opposite to each other, and two opposite sides of the light entrance surface 23 are connected to the bottom surface 24 and the light exit surface 25 respectively. The light source 3 is formed on the light entrance surface 23 of the light guiding plate 2, wherein a direction parallel to the light entrance surface 23 is defined as a horizontal direction X, and a direction vertical to the light entrance surface 23 is defined as a vertical direction Y. Then, an optical layer 4 is formed on the light guide plate 2 to prepare a backlight module, wherein the optical layer 4 according to this embodiment is formed by sequentially laminating a diffusion layer 41, a first prism layer 42, a second prism layer 43 and a diffusion sheet 44 on the light guide plate 2.

The backlight module obtained by the above process comprises: a housing 1; a light guiding plate 2 comprising a light entrance surface 23, a bottom surface 24, and a light exit surface 25, wherein the bottom surface 24 and the light exit surface 25 are spaced apart and disposed opposite to each other, and two opposite sides of the light entrance surface 23 are connected to the bottom surface 24 and the light exit surface 25 respectively; at least a light source 3 disposed adjacent the light entrance surface 23 of the light guiding plate 2; and at least an optical layer 4 disposed on the light guide plate 2. Basically, the light emitted from the light guide plate 2 and the light emitted from the optical layer 4 do not interfere with each other.

Figure 2A:
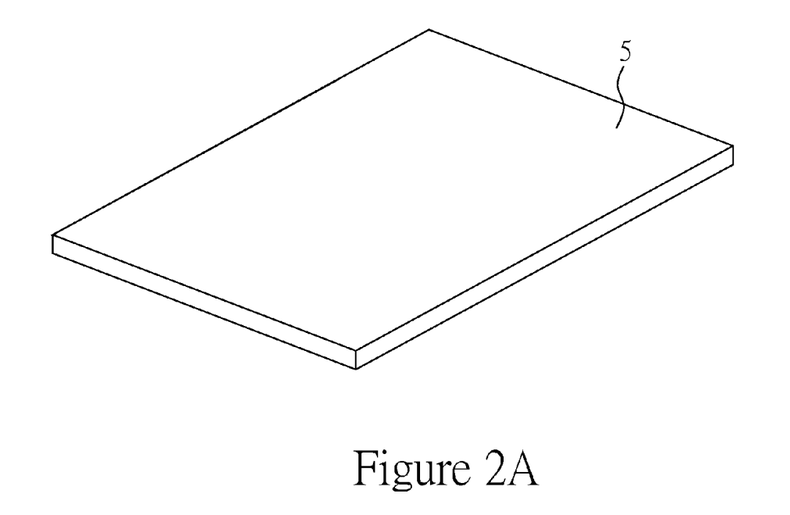
FIGS. 2A to 2C show a manufacturing flow chart of the template of the light guide plate according to the present invention.
Figure 2B:
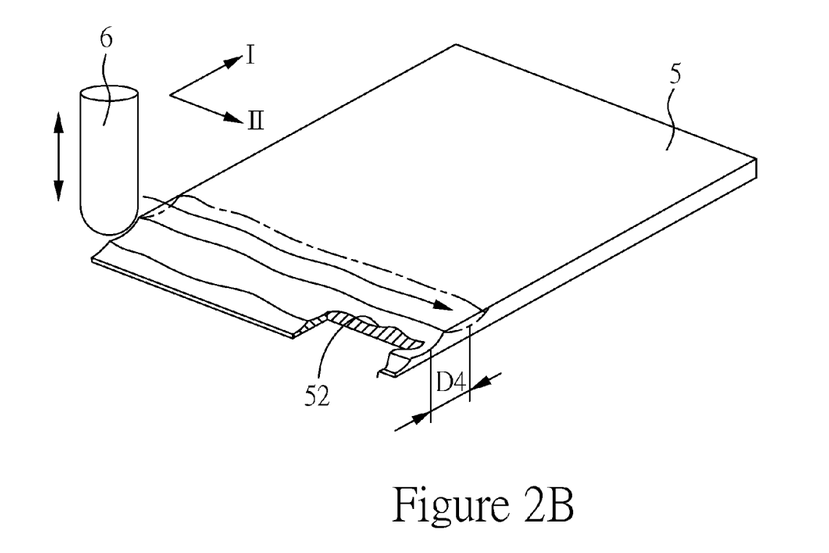
Figure 2C:
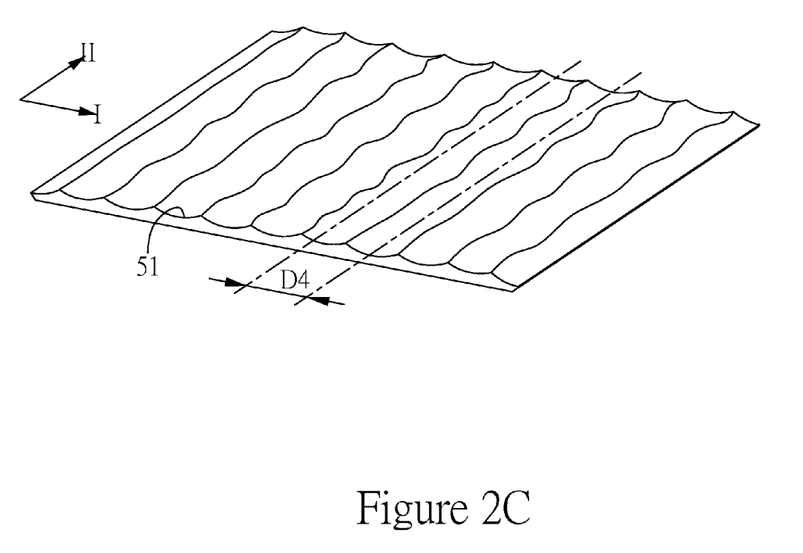

Basically, the light guide plate of the above-described embodiment may be formed by an imprinting process using a template. FIGS. 2A to 2C show a manufacturing flow chart of the template of the light guide plate according to the present invention. The method for manufacturing the template includes: (a) providing a substrate 5 and a round knife 6 having a fixed radius of curvature of 5 μm to 100 μm, wherein the substrate 5 has a first direction I and a second direction II perpendicular to the first direction I; (b) translating the round knife 6 along the second direction II of the substrate 5, while moving the round knife 6 vertically with respect to the substrate 5, so that a moving path of a vertex of the round knife 6 forms a mirroring second curve. Then, (c) translating the round knife 6 along the first direction I of the substrate 5 to a distance D4, and performing the step (b) to form a plurality of different mirroring second curves 52; (d) repeating the step (c), so that a cross-sectional of the substrate 5 in the first direction I forms a mirroring first curve 51 to obtain a template. As shown in FIG. 2C, after the preparation of the template, a raw material is subjected to an imprinting process using the template, to obtain a light guide plate 2.

In other words, the round knife 6 is used for cutting in the second direction II of the substrate 5, and in the cutting process, with respect to the surface of the substrate 5, the round knife 6 moves vertically up and down to change the cutting depth, to form a mirroring second curve 52. With respect to the surface of the substrate 5, the amplitude that the round knife 6 moves vertically up and down may be defined as an amplitude of the mirroring second curve 52, which satisfies the Equation 1 below:

$$\text{Amplitude} = \text{radius of curvature } R/\text{random parameter } A \quad \text{[Equation 1]}$$

wherein R is the radius of curvature of a round knife having a fixed radius of curvature, ranging from 5 μm to 100 μm, and random parameter A is in the range of −0.5<A<0.5.

For example, if the round knife of the present invention has a radius of curvature of 20 μm, the amplitude of the vertical movement is between −10 μm to 10 μm. That is, in the present embodiment, the distance between the peak and trough (i.e., FIG. 7, D5) of the mirroring second curve 52 may range between 0 μm and 20 μm. In other words, for the light guide plate 2 formed by imprinting through the template, the distance between the peak and trough of the second curve may range between 0 μm and 20 μm.

In the above template, the cutting depth of each mirroring second curve 52 is varied, so in the top view of the template, the edge profile of each mirroring second curve 52 has a varied curve, and preferably an irregular or non-periodic bending curve. When the light guide plate is formed into a curve of above features by the imprinting process, the collimated light phenomenon of the light guide can be destroyed to scatter the light to other directions, thus achieving the object of the present invention.

In addition, in the manufacturing process of light guide plate, the number of times that the round knife 6 moves vertically with respect to the substrate within a certain distance (i.e., knife putting and lifting) can be regulated to define the frequency density of the depth change. For example, when the round knife has a radius of curvature of 20 μm, the number of times that the round knife moves vertically may be set to 20 within a moving distance of 100 mm, such that the round knife 6 has a frequency density of the depth change of 20/100 (times/mm).

Figure 3:
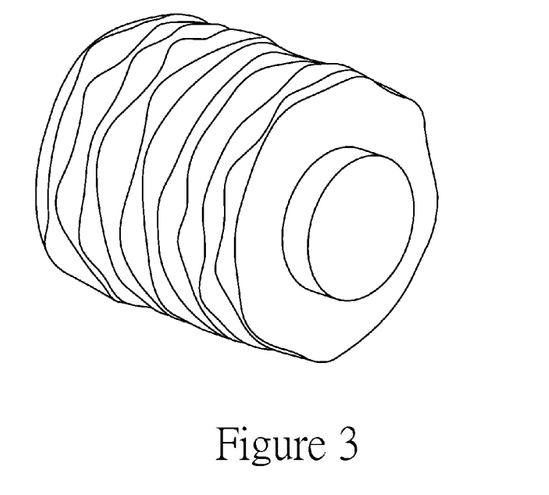
FIG. 3 shows a schematic diagram of the cylindrical template according to embodiments of the present invention.

Referring to the schematic diagram of the cylindrical template according to embodiments of the present invention in FIG. 3, in addition to the above-described plate-like template, the template of this embodiment may also be prepared into a cylindrical shape, as long as the imprinting effect can be achieved, and is not particularly limited.

Figure 4:
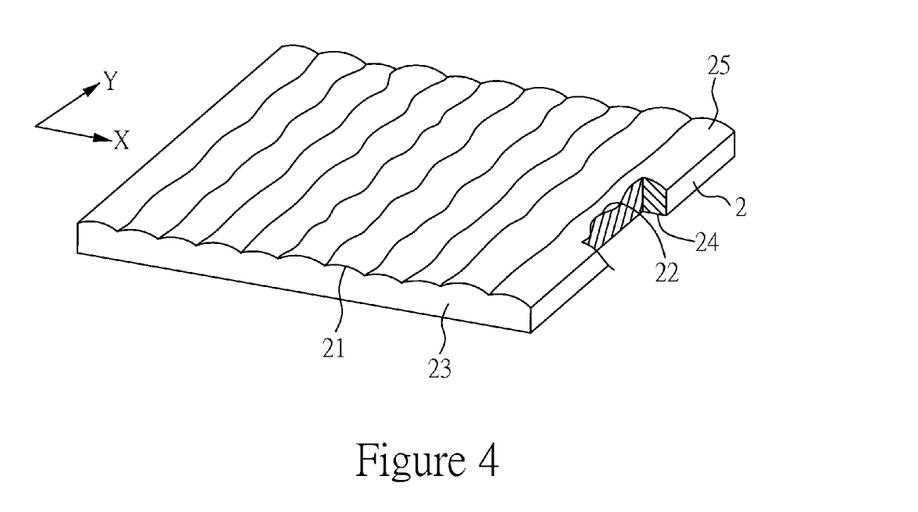
FIG. 4 shows a perspective view of the light guide plate according to embodiments of the present invention.

The detailed structure of the light guide plate 2 in this embodiment is shown in FIG. 4. FIG. 4 shows a perspective view of the light guide plate according to embodiments of the present invention. The light guide plate 2 obtained by the imprinting with the template includes a light entrance surface 23, a bottom 24 and a light exit surface 25, wherein the bottom surface 24 and the light exit surface 25 are spaced apart and disposed opposite to each other, and two opposite sides of the light entrance surface 23 are connected to the bottom surface 24 and the light exit surface 25 respectively, wherein a direction parallel to the light entrance surface 23 is defined as a horizontal direction X, and a direction vertical to the light entrance surface 23 is defined as a vertical direction Y; and a horizontal cross section of the light exit surface 23 of the light guiding plate has a first curve 21, while a vertical cross section of the light exit surface 25 of the light guiding plate 2 through any peak of the first curve 21 has a second curve 22.

Figure 5:
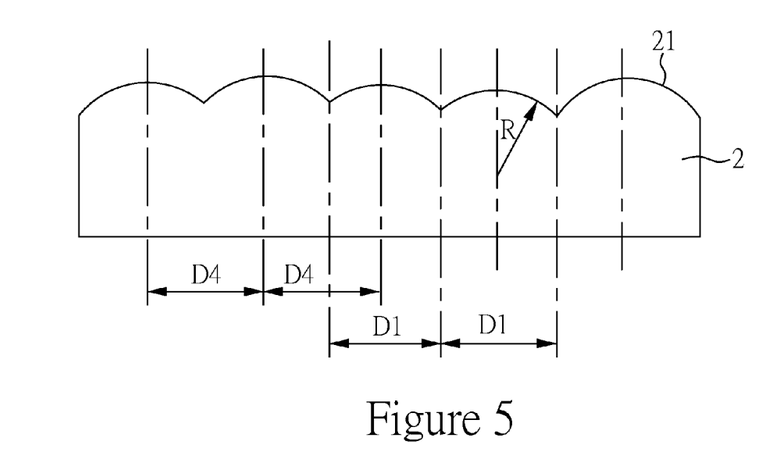
FIG. 5 shows a cross sectional view of FIG. 4 in a horizontal direction.

FIG. 5 shows a cross sectional view of FIG. 4 in a horizontal direction X, wherein the distances D4 between the adjacent peaks of the first curve 21 (i.e., the distance D4 that the round knife 6 is translated along the first direction I of the substrate in FIG. 2) are the same, and the adjacent troughs of the first curve are spaced apart by a plurality of first distances D1, wherein any two adjacent first distances D1 are different from each other. Furthermore, any waveform of the first curve 21 has a substantially equal radius of curvature (i.e., the radius of curvature R of the fixed round knife as set forth above), and a ratio of distances D4 between the radius of curvature of any two peaks of the first curve 21 is 0.5 to 20, while the distance D1 between any two adjacent troughs is in the range of 0<D1<2R. In an embodiment, the radius of curvature R of the first curve 21 is 5 µm to 100 µm; while in another preferred embodiment, the distance D4 between any two adjacent peaks of the first curve 21 is 15 µm to 60 µm.

The above-mentioned term "substantially equal" means substantially the same, and specifically, can be defined as 60-140% equivalence, preferably 80-120% equivalence, and more preferably 90-110% equivalence.

Figure 6:
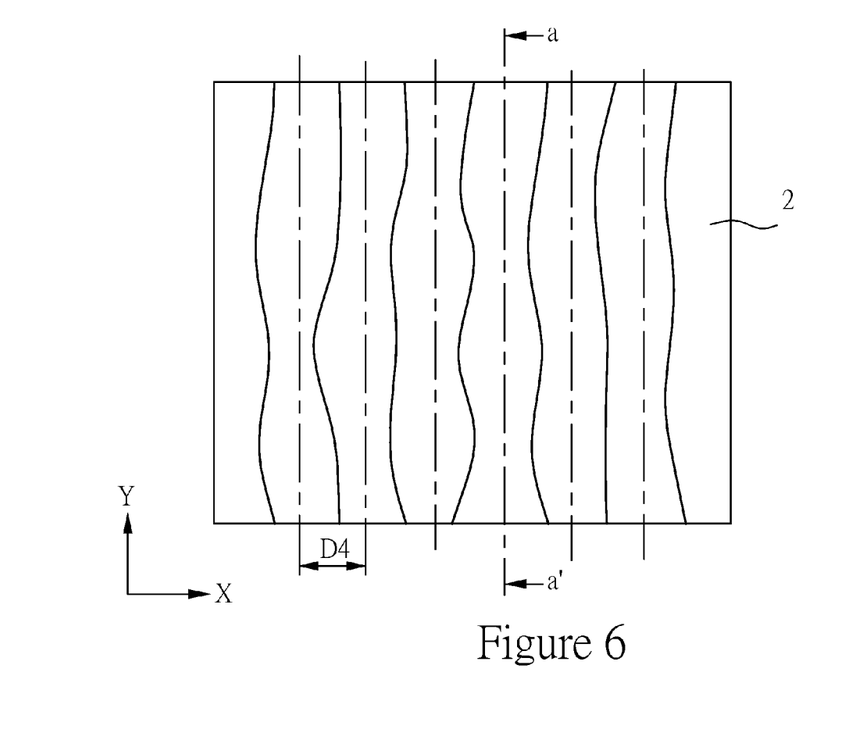
FIG. 6 shows a top view of FIG. 4.

FIG. 6 shows a top view of FIG. 4. It can be more understood from FIG. 6 that the structure of the light guide 2 of the present embodiment shows a plurality of irregular or non-periodic corrugations in the top view, and those corrugations may be not identical to each other. It is noted that vertexes of the peaks of the second curve 22 in the top view are connected in a straight line in the vertical direction Y as shown by the dotted line in FIG. 6.

Figure 7:
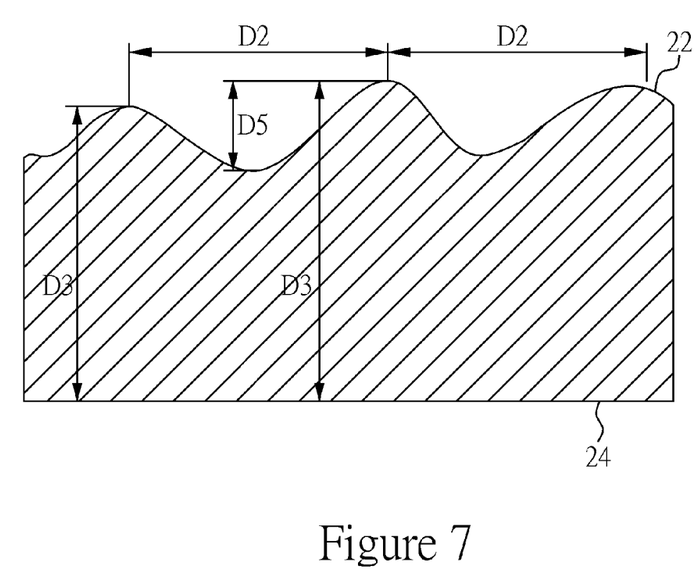
FIG. 7 shows a cross sectional view along the section line a-a' of FIG. 6.

FIG. 7 shows a cross sectional view along the section line a-a' of FIG. 6. In FIG. 7, the adjacent peaks of the second curve 22 are spaced apart by second distances D2, and any two adjacent second distances D2 are different from each other. A plurality second distances D2 of the second curve 22 are in the range of 0<D2≤20 mm.

The second distances D2 is designed randomly according to the product of a predetermined initial value and a predetermined parameter range. For example, in a preferred embodiment, the predetermined initial value is 10 mm, the predetermined parameter range is 0 to 2, and therefore the second distances are in the range of 0 to 20 mm. The predetermined initial value and the predetermined parameter range depend on the size and optical efficiency of the light guide plate. Taking the light guide plate of common size as an example, the second distances may be controlled in a range of 0 to 20 mm to effectively solving the hotspot problem. In other words, each of the peaks of the second curve 22 and the bottom surface 24 of the light guide plate 2 are spaced apart by a third distance D3, and any two adjacent third distances D3 are different from each other. In addition, an altitude difference D5 between the two adjacent peak and trough of the second curve 22 is preferably not greater than the radius of curvature R of the first curve 21.

Specifically, in the light guide plate, the first distances D1 of each first curve 21 have at least three different values, the second distances D2 of each second curve 22 have at least three different values, and the altitude difference D5 of each second curve 22 have at least three different values. Preferably, the first distances D1 are in the range of 0<D1<2R, the second distances D2 are in the range of 0<D2≤20 mm, and the altitude differences D5 are in the range of 0<D5<R (wherein R is the radius of curvature of the first curve 21), and the radius of curvature of each waveform of each second curve 22 is ranging from 0 to 1000 mm. In other words, in the light guide plate 2 of this embodiment, the first curve 21 is preferably an irregular undulating curve, and the undulations of the second curves 22 are different from each other, so that the light guide plate 2 in this embodiment can present an irregular or non-periodic corrugation.

Further, the curvature radius R of the round knife used in the light guide plate 2 of the present invention may be determined by the distance between the plurality of the light sources 3. In other words, the greater the distance between the plurality of the light source 3, the smaller the radius of curvature R. Conversely, the smaller the distance between the plurality of the light source 3, the greater the radius of curvature R.

Figure 8:
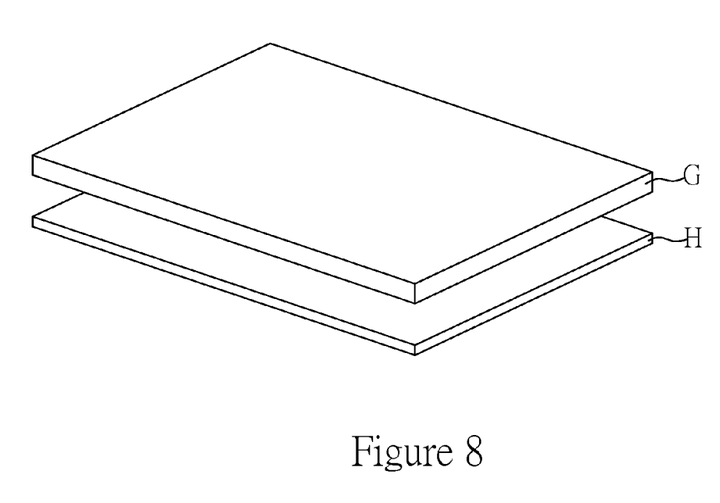
FIG. 8 shows a schematic diagram of the display according to embodiments of the present invention.

FIG. 8 shows a schematic diagram of the display according to embodiments of the present invention. The display comprises: a display panel G; and the backlight module H of the above embodiment of the present invention disposed on the display panel G.

While the invention has been shown and described with reference to certain exemplary embodiments thereof, it will be understood by those skilled in the art that various changes in form and details may be made therein without departing from the scope of the invention as defined by the appended claims.

What is claimed is:

1. A backlight module, comprising:
a housing;
a light guiding plate disposed in the housing, and the light guiding plate comprises a light entrance surface, a bottom surface, and a light exit surface, wherein the bottom surface and the light exit surface are spaced apart and disposed opposite to each other, and two opposite sides of the light entrance surface are connected to the bottom surface and the light exit surface respectively, wherein a direction parallel to the light entrance surface is defined as a horizontal direction; and
a light source disposed adjacent to the light entrance surface of the light guiding plate,
wherein a horizontal cross section of the light exit surface of the light guiding plate has a first curve, and a vertical cross section of the light exit surface of the light guiding plate through any peak of the first curve has a second curve, wherein adjacent peaks of the first curve have a same distance therebetween, adjacent troughs of the first curve are spaced apart by first distances and any two adjacent first distances are different from each other; and adjacent peaks of the second curve are spaced apart by second distances and any two adjacent second distances are different from each other, wherein each peak of the same second curve is located at a third distance from the bottom surface and any two adjacent third distances are different from each other.

2. The backlight module of claim 1, wherein any waveform of the first curve has a substantially equal radius of curvature, and a ratio of the radius of curvature to any two adjacent peaks of the first curve is 0.5 to 20.

3. The backlight module of claim 2, wherein an altitude difference between the two adjacent peak and trough of the second curve is less than once the radius of curvature of the first curve.

4. The backlight module of claim 1, wherein vertexes of the peaks of the second curve are connected in a straight line.

5. The backlight module of claim 1, wherein the second distances of the second curve are greater than 0 and not greater than 20 mm.

6. The backlight module of claim 1, wherein the second distances of the second curve have at least three different values, the third distances of the second curve have at least three different values, and the first distances of the first curve have at least three different values.

7. The backlight module of claim 1, wherein the first distance is greater than 0 and less than twice the radius of curvature of the first curve.

8. A display, comprising:
the backlight module of any of claims 1, 2-7; and
a display panel disposed at a side of the light exit surface of the light guiding plate.

9. A method for manufacturing a light guiding plate, comprising the following steps:
(a) providing a substrate and a round knife having a fixed radius of curvature, wherein the substrate has a first direction and a second direction perpendicular to the first direction;
(b) translating the round knife along the second direction of the substrate, while moving the round knife vertically with respect to the substrate, so that a moving path of a vertex of the round knife forms a mirroring second curve;
(c) translating the round knife along the first direction of the substrate to a distance, and performing the step (b) to form a plurality of mirroring second curves;
(d) repeating the step (c), so that a cross-sectional of the substrate in the first direction forms a mirroring first curve to produce a template; and
(e) performing an imprinting process using the template to obtain a light guiding plate;
wherein the light guiding plate comprises a light entrance surface, a bottom surface, and a light exit surface, wherein the bottom surface and the light exit surface are spaced apart and disposed opposite to each other, and two opposite sides of the light entrance surface are connected to the bottom surface and the light exit surface respectively;
wherein adjacent troughs of the mirroring first curve are spaced apart by first distances, adjacent peaks of the mirroring second curve are spaced apart by second distances, and each peak of the same mirroring second curve is located at a third distance from the bottom surface, wherein the first distances of the mirroring first curve have at least three different values, the second distances of the mirroring second curve have at least three different values, and the third distances of the mirroring second curve have at least three different values.

* * * * *